United States Patent
Davydov et al.

(10) Patent No.: US 9,609,564 B2
(45) Date of Patent: Mar. 28, 2017

(54) FAST MODULATION AND CODING SCHEME ADAPTATION PROTOCOL FOR LONG TERM EVOLUTION WITH MULTIPLE-USER MULTIPLE INPUT, MULTIPLE OUTPUT

(71) Applicant: Intel Corporation, Santa Clara, CA (US)

(72) Inventors: Alexei Davydov, Nizhny Novgorod (RU); Gregory Morozov, Nizhny Novgorod (RU); Seunghee Han, San Jose, CA (US); Alexander Maltsev, Nizhny Novgorod (RU); Ilya Bolotin, Nizhny-Novgorod (RU); Vadim Sergeyev, Nizhny Novgorod (RU); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,472

(22) PCT Filed: Oct. 10, 2013

(86) PCT No.: PCT/US2013/064385
§ 371 (c)(1),
(2) Date: Dec. 11, 2013

(87) PCT Pub. No.: WO2014/070410
PCT Pub. Date: May 8, 2014

(65) Prior Publication Data
US 2015/0171939 A1    Jun. 18, 2015

Related U.S. Application Data
(60) Provisional application No. 61/721,436, filed on Nov. 1, 2012.

(51) Int. Cl.
*H04J 1/16* (2006.01)
*H04W 36/20* (2009.01)
(Continued)

(52) U.S. Cl.
CPC .......... *H04W 36/20* (2013.01); *H04B 7/0417* (2013.01); *H04B 7/0452* (2013.01);
(Continued)

(58) Field of Classification Search
CPC .... H04W 24/02; H04W 24/10; H04L 1/0015; H04L 1/0026; H04L 1/0033
See application file for complete search history.

(56) References Cited

U.S. PATENT DOCUMENTS 1,789,317 A    1/1931   McLeish
8,885,458 B2  11/2014   Diachina et al.
(Continued)

FOREIGN PATENT DOCUMENTS

CN    104782166 A    7/2015
CN    104904137 A    9/2015
(Continued)

OTHER PUBLICATIONS

"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
(Continued)

*Primary Examiner* — Alvin Zhu
(74) *Attorney, Agent, or Firm* — Schwegman Lundberg & Woessner, P.A.

(57) ABSTRACT

Embodiments for providing fast modulation and coding scheme adaptation for LTE regardless of transmission using single-user multiple-input and multiple-output (SU-MIMO) or multiple-user multiple-input and multiple-output are generally described herein. In some embodiments, channel state information reference signals are sent to user equipment by a node. First channel quality indication feedback based on the channel state information reference signals is received
(Continued)

from the user equipment. Physical downlink shared channel data and demodulation reference signals are transmitted using a first modulation and coding scheme based on the first channel quality indication feedback. Second channel quality indication feedback based on measurements performed by the user equipment on the demodulation reference signals is received by a node. Physical downlink shared channel data is transmitted using a second modulation and coding scheme based on the second channel quality indication feedback.

23 Claims, 7 Drawing Sheets

(51) Int. Cl.

| | | |
|---|---|---|
| *H04W 28/24* | (2009.01) | |
| *H04W 52/02* | (2009.01) | |
| *H04W 24/08* | (2009.01) | |
| *H04J 3/06* | (2006.01) | |
| *H04L 5/00* | (2006.01) | |
| *H04W 16/24* | (2009.01) | |
| *H04W 8/00* | (2009.01) | |
| *H04W 72/04* | (2009.01) | |
| *H04W 76/02* | (2009.01) | |
| *H04B 7/0417* | (2017.01) | |
| *H04B 7/0452* | (2017.01) | |
| *H04B 7/06* | (2006.01) | |
| *H04W 28/02* | (2009.01) | |
| *H04W 4/00* | (2009.01) | |
| *H04W 76/04* | (2009.01) | |
| *H04L 29/12* | (2006.01) | |
| *H04W 16/20* | (2009.01) | |
| *H04W 16/26* | (2009.01) | |
| *H04W 60/04* | (2009.01) | |
| *H04W 64/00* | (2009.01) | |
| *H04W 36/14* | (2009.01) | |
| *H04W 24/10* | (2009.01) | |
| *H04J 11/00* | (2006.01) | |
| *H04W 28/04* | (2009.01) | |
| *H04W 72/06* | (2009.01) | |
| *H04W 72/08* | (2009.01) | |
| *H04W 36/30* | (2009.01) | |
| *H04W 72/12* | (2009.01) | |
| *H04W 24/04* | (2009.01) | |
| *H04W 88/02* | (2009.01) | |
| *H04W 88/08* | (2009.01) | |
| *H04W 88/06* | (2009.01) | |
| *H04W 88/16* | (2009.01) | |
| *H04W 24/02* | (2009.01) | |

(52) U.S. Cl.
CPC .......... *H04B 7/0626* (2013.01); *H04J 3/0614* (2013.01); *H04J 11/00* (2013.01); *H04L 5/0046* (2013.01); *H04L 5/0048* (2013.01); *H04L 61/3005* (2013.01); *H04L 61/3075* (2013.01); *H04W 4/005* (2013.01); *H04W 8/005* (2013.01); *H04W 16/20* (2013.01); *H04W 16/24* (2013.01); *H04W 16/26* (2013.01); *H04W 24/04* (2013.01); *H04W 24/08* (2013.01); *H04W 24/10* (2013.01); *H04W 28/0268* (2013.01); *H04W 28/046* (2013.01); *H04W 28/24* (2013.01); *H04W 36/14* (2013.01); *H04W 36/30* (2013.01); *H04W 52/0216* (2013.01); *H04W 52/0235* (2013.01); *H04W 60/04* (2013.01); *H04W 64/003* (2013.01); *H04W 72/042* (2013.01); *H04W 72/0413* (2013.01); *H04W 72/0446* (2013.01); *H04W 72/06* (2013.01); *H04W 72/08* (2013.01); *H04W 72/1231* (2013.01); *H04W 76/023* (2013.01); *H04W 76/046* (2013.01); *H04W 76/048* (2013.01); *H04L 5/006* (2013.01); *H04W 24/02* (2013.01); *H04W 88/02* (2013.01); *H04W 88/06* (2013.01); *H04W 88/08* (2013.01); *H04W 88/16* (2013.01); *Y02B 60/50* (2013.01)

(56) References Cited

U.S. PATENT DOCUMENTS

| | | |
|---|---|---|
| 9,100,160 B2 | 8/2015 | Martinez Tarradell et al. |
| 9,225,399 B2 | 12/2015 | Shan et al. |
| 2001/0051994 A1 | 12/2001 | Serizawa et al. |
| 2008/0188247 A1 | 8/2008 | Worrall |
| 2009/0268624 A1 | 10/2009 | Imamura et al. |
| 2011/0038326 A1 | 2/2011 | Davies et al. |
| 2011/0059744 A1 | 3/2011 | Won et al. |
| 2011/0110347 A1 | 5/2011 | Mun |
| 2011/0149728 A1 | 6/2011 | Lee |
| 2011/0190000 A1 | 8/2011 | Kwun |
| 2011/0205886 A1* | 8/2011 | Maruyama ........ H04L 12/40176 370/225 |
| 2011/0267854 A1* | 11/2011 | Flannery ............... H02M 7/493 363/72 |
| 2011/0310769 A1 | 12/2011 | Lee et al. |
| 2011/0319065 A1 | 12/2011 | Dalsgaard et al. |
| 2012/0057479 A1* | 3/2012 | Maruyama ......... G05B 19/4185 370/252 |
| 2012/0102240 A1* | 4/2012 | Wei ....................... H04L 12/403 710/30 |
| 2012/0113844 A1 | 5/2012 | Krishnamurthy |
| 2012/0155406 A1 | 6/2012 | Kim et al. |
| 2012/0207105 A1 | 8/2012 | Geirhofer et al. |
| 2012/0218913 A1 | 8/2012 | Park et al. |
| 2012/0252518 A1 | 10/2012 | Karampatsis et al. |
| 2013/0080597 A1 | 3/2013 | Liao |
| 2013/0196679 A1 | 8/2013 | Widell et al. |
| 2013/0301558 A1 | 11/2013 | Zakrzewski |
| 2013/0303206 A1 | 11/2013 | Starsinic et al. |
| 2014/0016614 A1 | 1/2014 | Velev et al. |
| 2014/0029625 A1* | 1/2014 | Edmiston ............... H04L 49/257 370/401 |
| 2014/0036795 A1 | 2/2014 | Martinez Tarradell et al. |
| 2014/0071952 A1* | 3/2014 | Kim ....................... H04L 5/001 370/335 |
| 2014/0092733 A1 | 4/2014 | Johansson et al. |
| 2014/0094125 A1 | 4/2014 | Behravan et al. |
| 2014/0113667 A1 | 4/2014 | Keller et al. |
| 2014/0119261 A1 | 5/2014 | Wang et al. |
| 2014/0226616 A1* | 8/2014 | Ihm ........................ H04B 7/04 370/329 |
| 2014/0269779 A1 | 9/2014 | Shan et al. |
| 2015/0230234 A1 | 8/2015 | Choi et al. |
| 2015/0245221 A1 | 8/2015 | Yiu et al. |

FOREIGN PATENT DOCUMENTS

| | | |
|---|---|---|
| EP | 2369883 A1 | 9/2011 |
| EP | 2915358 A1 | 9/2015 |
| KR | 1020120094369 A | 8/2012 |
| KR | 1020120096408 A | 8/2012 |
| WO | WO-2012112281 A2 | 8/2012 |
| WO | WO-2014070410 A1 | 5/2014 |
| WO | WO-2014070649 A1 | 5/2014 |
| WO | WO-2014070901 A1 | 5/2014 |
| WO | WO-2014070929 A1 | 5/2014 |

OTHER PUBLICATIONS

"Evolved Universal Terrestrial Radio Access (E-UTRA); Radio Resource Control (RRC);", 3GPP TS 36.331 V11.1.0 (Sep. 2012)

(56) References Cited

OTHER PUBLICATIONS

Technical Specification Group Radio Access Network; Protocol specification (Release 11), (Sep. 2012), 325 pgs.
"Evolved Universal Terrestrial Radio Access (E-UTRA); Study on signalling and procedure for interference avoidance for in-device coexistence", 3GPP TR 36.816 V11.1.0 (Sep. 2011) Technical Specification Group Radio Access Network (Release 11), (Sep. 2011), 44 pgs.
"Inter-RAT mobility for UE under IDC interference", 3GPP TSG-RAN WG2 #79bis; R2-124725; Agenda Item 7.6.3; LG Electronics Inc., (Oct. 8, 2012), 1 pg.
"Inter-RAT operation for in-device coexistence", 3GPP TSG RAN WG2 Meeting #80; R2-125750; Agenda Item 7.6.1; Intel Corporation, (Nov. 12, 2012), 2 pgs.
"Title Change Request", 3GPP TSG-RAN WG2 Meeting #79bis; R2-125108, (Oct. 8, 2012), 5 pgs.
Hong, Wei, et al., "Considering In-Device Coexistence interference from WiFi point of view", IEEE 802.11-13/0880-00, (Jul. 17, 2013), 13 pgs.
"U.S. Appl. No. 14/124,939, Preliminary Amendment filed Dec. 9, 2013", 9 pgs.
"U.S. Appl. No. 14/126,611, Preliminary Amendment filed Dec. 16, 2013", 11 pgs.
"Evaluation of MTC Device triggering", HTC TD S2-110732, 3GPP TSG SA WG2 Meeting #83, (Feb. 2011), 2 pgs.
"International Application Serial No. PCT/US2013/064385, International Search Report mailed Jan. 29, 2014", 3 pgs.
"International Application Serial No. PCT/US2013/064385, Written Opinion mailed Jan. 29, 2014", 8 pgs.
"International Application Serial No. PCT/US2013/067043, International Search Report mailed Feb. 25, 2014", 4 pgs.
"International Application Serial No. PCT/US2013/067043, Written Opinion mailed Feb. 25, 2014", 6 pgs.
"International Application Serial No. PCT/US2013/067522, International Search Report mailed Feb. 12, 2014", 3 pgs.
"International Application Serial No. PCT/US2013/067522, Written Opinion mailed Feb. 12, 2014", 6 pgs.
"International Application Serial No. PCT/US2013/067575, International Search Report mailed Feb. 21, 2014", 3 pgs.
"International Application Serial No. PCT/US2013/067575, Written Opinion mailed Feb. 21, 2014", 6 pgs.
"Triggering a detached MTC device", InterDigital Communications, TD S2-110673, 3GPP TSG SA WG2 Meeting #83, (Feb. 2011), 4 pgs.
"3GPP MTC Standard TTA M2M Seminar", ETRI Standards Research Center, [Online] retrieved from the internet: <edu.tta.or.kr/sub3/down.php?No=123&file=M2M_1-4.pdf>, (Oct. 23, 2012).
"U.S. Appl. No. 14/126,611, Non Final Office Action mailed Oct. 23, 2014", 10 pgs.
"The Mobile Broadband Standard", 3GPP List of Work Items, [Online] retrieved from the internet: <http://www.3gpp.org/DynaReport/WI-List.html>.
"Chinese Application Serial No. 201380051575.X, Voluntary Amendment mailed Dec. 21, 2015", W/ English Claims, 13 pgs.
"International Application Serial No. PCT/US2013/064385, International Preliminary Report on Patentability mailed May 14, 2015", 10 pgs.
"International Application Serial No. PCT/US2013/067043, International Preliminary Report on Patentability mailed May 14, 2015", 8 pgs.
"International Application Serial No. PCT/US2013/067522, International Preliminary Report on Patentability mailed May 14, 2015", 8 pgs.
"International Application Serial No. PCT/US2013/067575, International Preliminary Report on Patentability mailed May 14, 2015", 8 pgs.
"U.S. Appl. No. 14/124,939, Non Final Office Action mailed Oct. 29, 2015", 31 pgs.
"U.S. Appl. No. 14/124,939, Response filed Feb. 29, 2016 to Non Final Office Action mailed Oct. 29, 2015", 15 pgs.
"U.S. Appl. No. 14/126,611, Final Office Action mailed May 22, 2015", 11 pgs.
"U.S. Appl. No. 14/126,611, Notice of Allowance mailed Aug. 19, 2015", 12 pgs.
"U.S. Appl. No. 14/126,611, Response filed Jan. 23, 2015 to Non Final Office Action mailed Oct. 23, 2014", 12 pgs.
"U.S. Appl. No. 14/126,611, Response filed Jul. 24, 2015 to Final Office Action mailed May 22, 2015", 9 pgs.
"Chinese Application Serial No. 201380051478.0, Preliminary Amendment filed Oct. 20, 2015", W/ English Claims, 18 pgs.
U.S. Appl. No. 14/433,815, filed Apr. 6, 2015, PCI Partition and Allocation for Cellular Network.

\* cited by examiner

FAST MODULATION AND CODING SCHEME ADAPTATION PROTOCOL FOR LONG TERM EVOLUTION WITH MULTIPLE-USER MULTIPLE INPUT, MULTIPLE OUTPUT

This application is a U.S. National Stage Application filed under 35 U.S.C. 371 of International Application No. PCT/US2013/064385, filed Oct. 10, 2013, which claims the benefit of priority to U.S. Provisional Patent Application Ser. No. 61/721,436, filed on Nov. 1, 2012, which applications are incorporated herein by reference in their entireties.

BACKGROUND

Multiple-input and multiple-output (MIMO) is a feature of Long Term Evolution (LTE), which is a fourth generation (4G) wireless communication standard for providing high-speed data for mobile phones and data terminals. MIMO is based on the use of multiple antennas at both the transmitter and receiver to improve communication performance, e.g., by providing multiple radio channels. Multiuser MIMO (MU-MIMO) communications is one example of MIMO, wherein a base station (eNB) may simultaneously communicate with several user equipments (UEs), provided that substantial spatial insulation between the UEs exists.

Introduction of this kind of communications affects performance of data rate adaptation mechanisms. For example, selection of an appropriate modulation and coding scheme (MCS) for downlink (DL) communication with a UE is currently based on channel quality information (CQI) report from that UE. Appropriate CQI measurements are performed in the assumption of single-user MIMO (SU-MIMO), which may cause mismatch between the reported CQI and the real CQI that the UE will experience during MU-MIMO communication. The mismatch appears because the additional link(s) to other UE(s) create interference onto the UE that reported the CQI, and this interference is not known to the UE during CQI measurements.

Accordingly, eNB is likely to assign optimistic data rate (modulation and coding scheme) for the UE, which leads to increased error level for PDSCH transmission to the UE. Current LTE specifications provide so called "outer loop" mechanism to handle this increased error level. This mechanism tracks the ACK/NACK messages from the UE and based on their statistics adjusts the data rate of PDSCH sent to the UE. Nevertheless, this mechanism is relatively slow since it involves gathering error statistics over several tens of data packets delivered to the UE.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Figure 4:
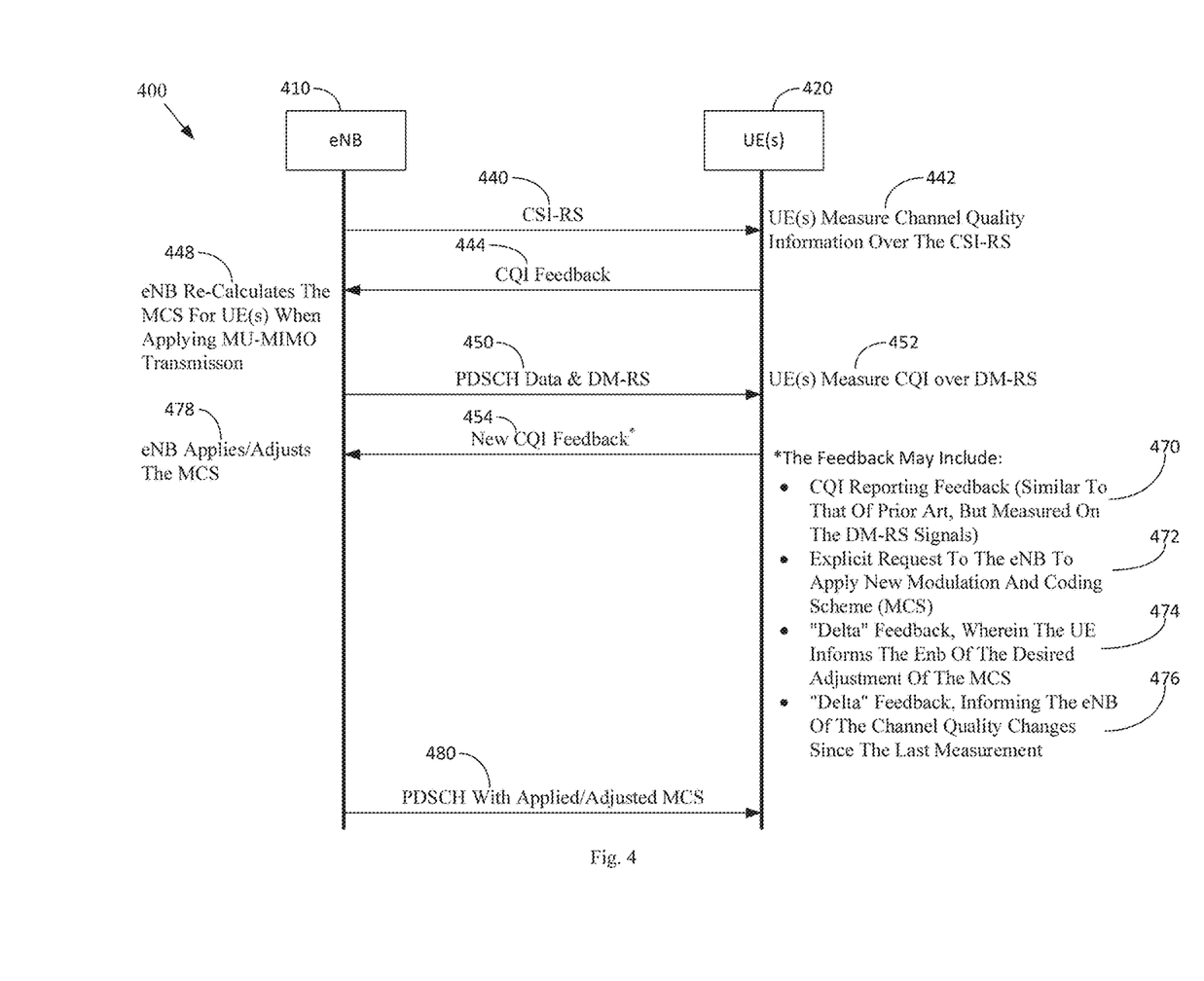
FIG. 4 illustrates channel quality information measurement using demodulation reference signals (DM-RS) according to an embodiment.

Embodiments provide for fast adaptation of the modulation and coding scheme (MCS) for UEs with Multiple-input and multiple-output (MIMO). CQI feedback may include CQI reporting feedback based on measurements performed on the DM-RS signals 470, an explicit request from the UE(s) to the eNB to apply a new modulation and coding scheme (MCS) based on the measurements performed on the DM-RS signals, delta feedback wherein the UE(s) requests the eNB make an adjustment to the MCS based on the measurements performed on the DM-RS signals and delta feedback that informs the eNB of channel quality changes since the last measurement UE(s) performed. The eNB may apply and/or adjust the MCS. The applied and/or adjusted MCS may then be included during the next PDSCH transmissions to the UE(s).

Figure 1:
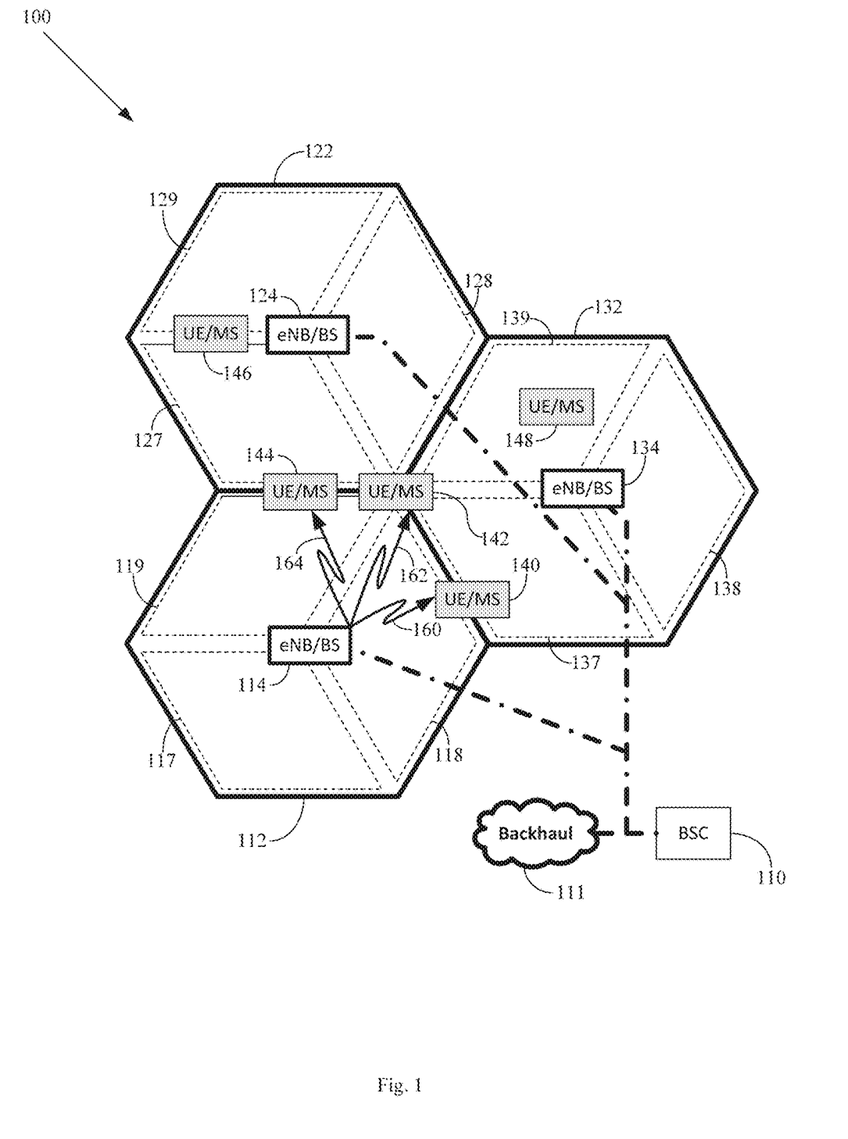
FIG. 1 shows a wireless communications system according to an embodiment.

FIG. 1 shows a wireless communications system 100 according to an embodiment. In FIG. 1, base station controller (BSC) 110 controls wireless communications within multiple cells 112, 122, 132. Cells 112, 122, 132 are served by corresponding base stations (BS) 114, 124, 134. In some configurations, each cell is further divided into multiple sectors. For example, cell 112 is divided into a first sector 117, a second sector 118 and a third sector 119. Cell 122 is divided into a first sector 127, a second sector 128 and a third sector 129. Cell 132 is divided into a first sector 137, a second sector 138 and a third sector 139. While each cell 112, 122, 132 shown in FIG. 1 is divided into three sectors, those or ordinary skill in the art will understand that each cell 112, 122, 132 may be divided into more or less sectors and some of cells 112, 122, 132 may have different number of sectors from other cells 112, 122, 132. In some embodiments at least some sectors may be viewed as cells.

In general, each base station 114, 124, 134 facilitates communications using OFDM with mobile and/or wireless terminals 140, 142, 144, 146, 148, which are within the cells 112, 122, 132 associated with corresponding base stations 114, 124, 134. The movement of a mobile terminals, e.g., UE 140, in relation to the base stations 114, 134 may result in significant fluctuation in channel conditions. Although not shown in FIG. 1, the base stations 114, 124, 134 and mobile terminals 140, 142, 144, 146, 148 may include multiple antennas to provide spatial diversity for communications. In FIG. 1, eNB 114 is shown sending data transmissions 160, 162, 164 to multiple MIMO-UEs 140, 142, 144 on the same time-frequency resource, e.g., with the help of beam-steering.

UEs 140, 142, 144, 146, 148 may be handed over from any cell 112, 122, 132, sector 117, 118, 119, 127, 128, 129,137, 138, 139, zone (not shown), base stations 114, 124, 134 to another of cells 112, 122, 132, sector 117, 118, 119, 127, 128, 129,137, 138, 139, zone (not shown), or other of base stations 114, 124, 134. In some configurations, base stations 114, 124, 134 communicate with each other and with another network (such as a core network or the internet, both not shown) over a backhaul network 111. In some configurations, a base station controller 110 is not used.

Figure 2:
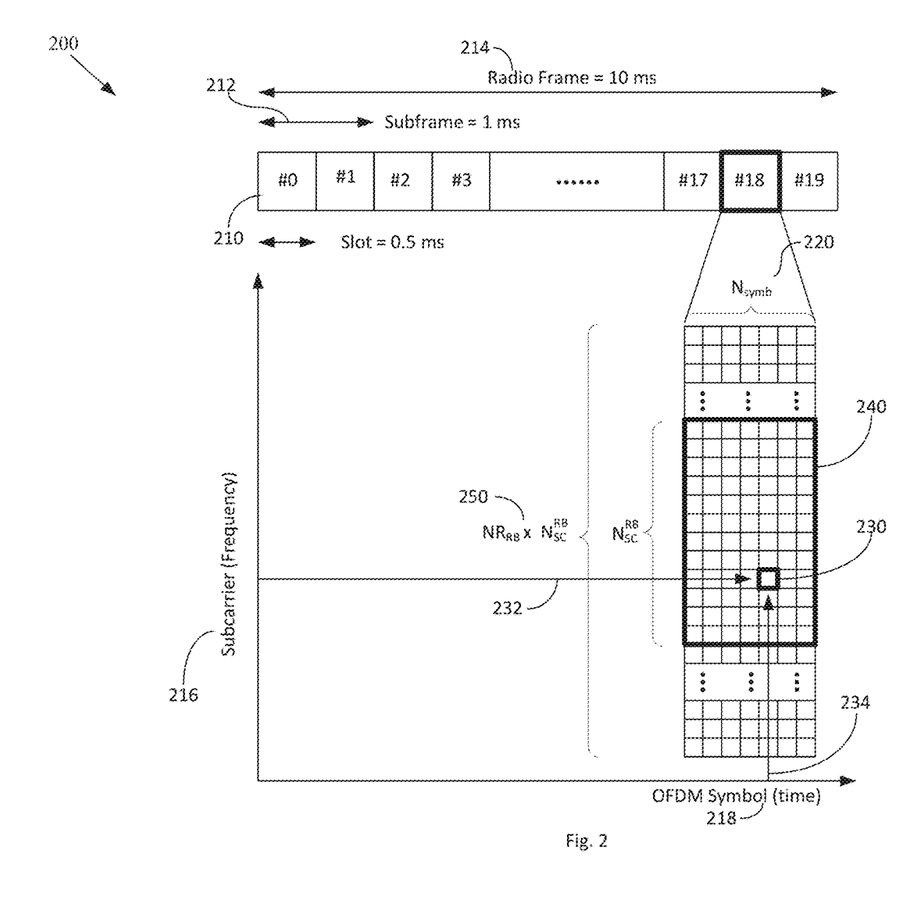
FIG. 2 illustrates a frame structure according to an embodiment.

FIG. 2 illustrates a frame structure 200 according to an embodiment. In FIG. 2, the frame 214 has an overall length of 10 ms. This is then divided into a total of 20 individual slots 210. Each subframe 212 includes two slots 210 of length 0.5 ms, and each slot 210 contains a number of OFDM symbols, $N_{symb}$ 220. Thus, there are 10 subframes 212 within a frame 214. Subframe #18 is shown expanded with reference to a subcarrier (frequency) axis 216 and an OFDM symbol (time) axis 218.

A resource element (RE) 230 is the smallest identifiable unit of transmission and involves one subcarrier 232 for an OFDM symbol period 234. Transmissions are scheduled in larger units called resource blocks (RBs) 240 which comprise a number of adjacent subcarriers 232 for a period of one 0.5-ms timeslot. Accordingly, the smallest dimensional unit for assigning resources in the frequency domain is a "resource block" (RB) 240, i.e., a group of $N_{sc}^{RB}$ adjacent subcarriers 232 constitute a resource block (RB) 240. Each subframe 212 includes "n" resource blocks, i.e., $N_{RB} \times N_{sc}^{RB}$ 250.

Figure 3:
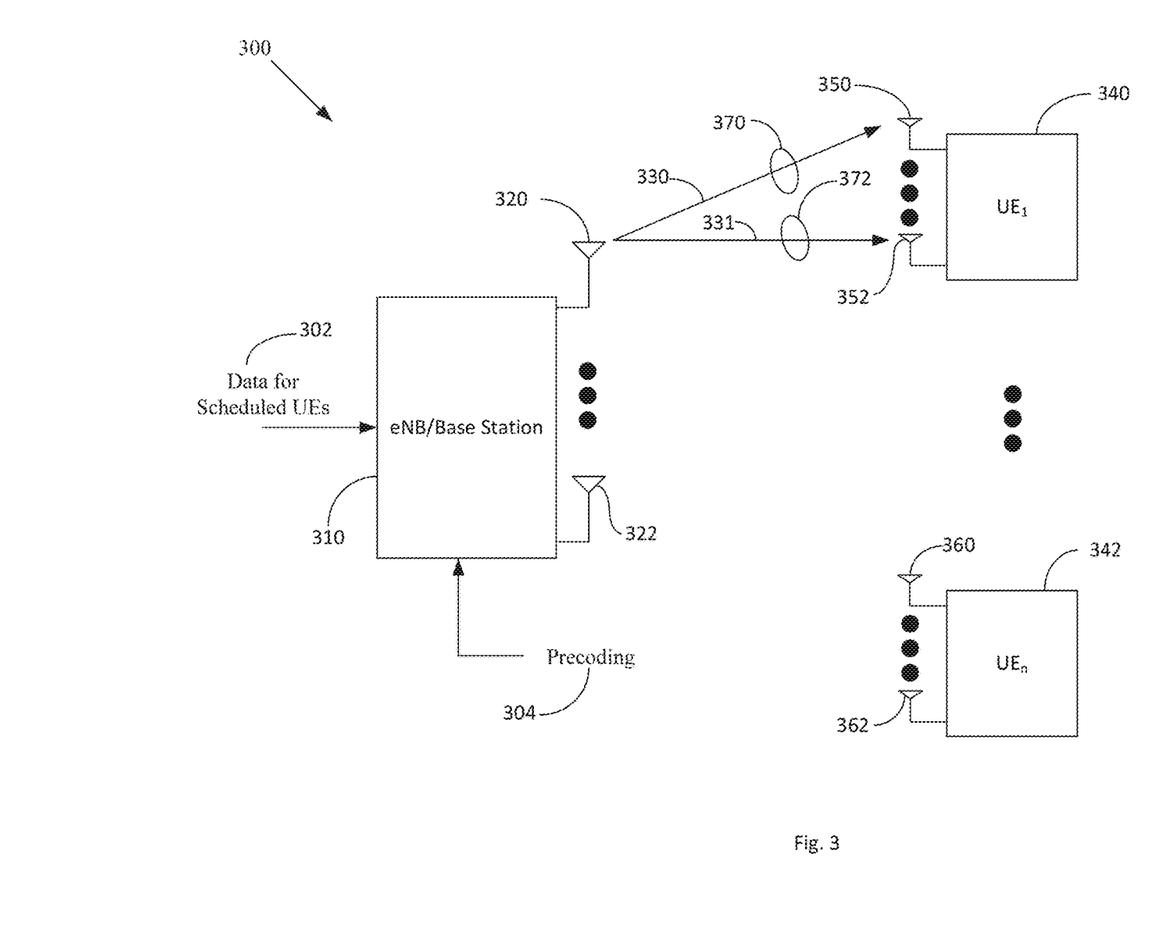
FIG. 3 shows MU-MIMO data transmission according to an embodiment.

FIG. 3 shows MU-MIMO data transmission 300 according to an embodiment. In FIG. 3, eNB 310 receives data 302 that is scheduled for $UE_1$ 340 and $UE_n$ 342. Precoding 304 may be applied to the data 302. Antenna 320 sends signal 330 to the UE 340. Signal 330 may be received by all antennas 350-352 of UE 340. Alternatively, signals 330 and 331 may represent the same signal that pass through different channels 370, 372. For example, the first channel 370 may be the one between antennas 320 and 350; and the second channel 372 may be the one between antennas 320 and 352. The eNB 310 may also transmits signals from the first antenna 320 of eNB 310 to a first antenna 360 and a second antenna 362 of $UE_n$ 342.

The signals from eNB 310 to $UE_1$ 340, $UE_n$ 342 may be transmitted on a given time-frequency resource. As illustrated in FIG. 3, the eNB 310 may be equipped with multiple antennas 320, 322. For SU-MIMO, the eNB 310 may send signals to $UE_1$ 340, which is equipped with multiple antennas 350, 352. For MU-MIMO, eNB 310 may send data transmission to multiple UEs, e.g., $UE_1$ 340, $UE_n$ 342, and each of $UE_1$ 340 and $UE_n$ 342 may be equipped with one or more antennas 350, 352 and 360, 362, respectively. For simplicity, the following description assumes that each of $UE_1$ 340 and $UE_n$ are equipped with multiple antennas 350, 352 and 360, 362, respectively.

FIG. 4 illustrates channel quality information measurement using demodulation reference signals (DM-RS) 400 according to an embodiment. FIG. 4 shows an eNB 410 in communication with at least one UE 420. The eNB 410 may be arranged to send CSI-RS 440 to UE(s) 420. The UE(s) 420 measures 442 the channel quality information over the CSI-RS and sends the CQI feedback 444 to the eNB 410. The eNB 410 receives CQI feedback 444 from the UE(s) 420 and re-calculates 448 the MCS for UE(s) when applying MU-MIMO transmission. The eNB 410 is further arranged to then transmit PDSCH data and DM-RS 450 to the UE(s) 420. The DM-RSs are sent together with the PDSCH 450 to the UE(s) 420 and are beam-formed in the same way as PDSCH signals. The UE(s) 420 measures 452 CQI over the DM-RS signals. Thus, the CQI measurements performed over DM-RS 452 may provide accurate representation of the real channel quality for the UE(s) 420 regardless of whether SU or MU MIMO mode was used for transmissions to that UE(s) 420.

The UE(s) 420 sends new CQI feedback 454 to the eNB 410. The new CQI feedback 454 may be CQI reporting feedback based on measurements performed on the DM-RS signals 470, an explicit request from the UE(s) 420 to the eNB 410 to apply a new modulation and coding scheme (MCS) based on the measurements performed on the DM-RS signals 472, delta feedback wherein the UE(s) 420 requests the eNB 410 make an adjustment to the MCS based on the measurements performed on the DM-RS signals 474 and delta feedback that informs the eNB 410 of channel quality changes since the last measurement UE(s) 420 performed 476. The eNB 420 applies and/or adjusts 478 the MCS. The applied and/or adjusted MCS is included during the next PDSCH transmissions 480 to the UE(s) 420.

Figure 5:
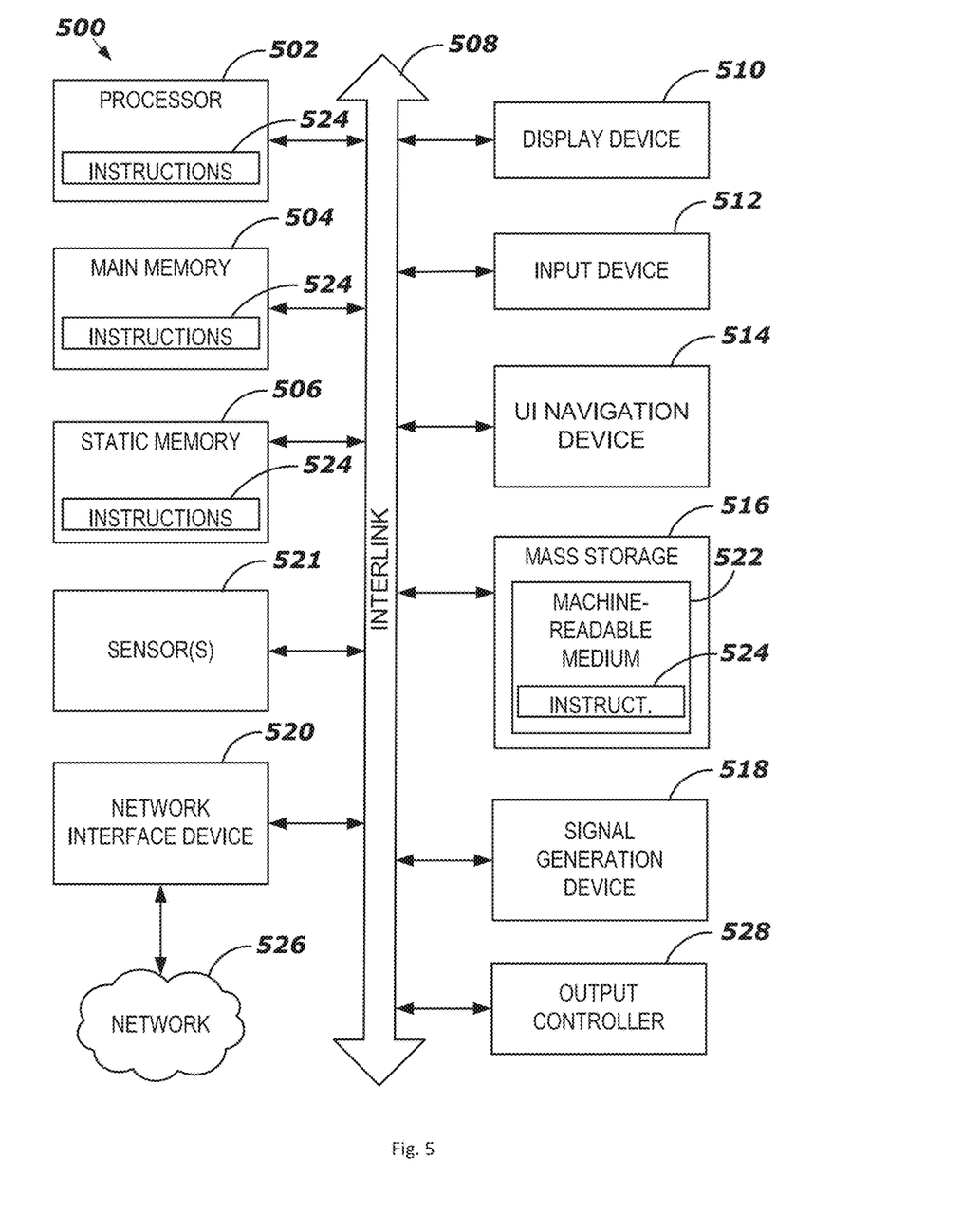
FIG. 5 illustrates a block diagram of an example machine for providing enhanced interference measurements with CSI feedback according to an embodiment.

FIG. 5 illustrates a block diagram of an example machine 500 for providing enhanced interference measurements with CSI feedback according to an embodiment upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine and/or a client machine in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 502 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 502 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 500 may include a hardware processor 502 (e.g., a central processing unit (CPU), a graphics processing unit (GPU), a hardware processor core, or any combination thereof), a main memory 504 and a static memory 506, at least some of which may communicate with others via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The storage device 516 may include at least one machine readable medium 522 on which is stored one or more sets of data structures or instructions 524 (e.g., software) embodying or utilized by any one or more of the techniques or functions described herein. The instructions 524 may also reside, at least partially, additional machine readable memories such as main memory 504, static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) that configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Figure 6:
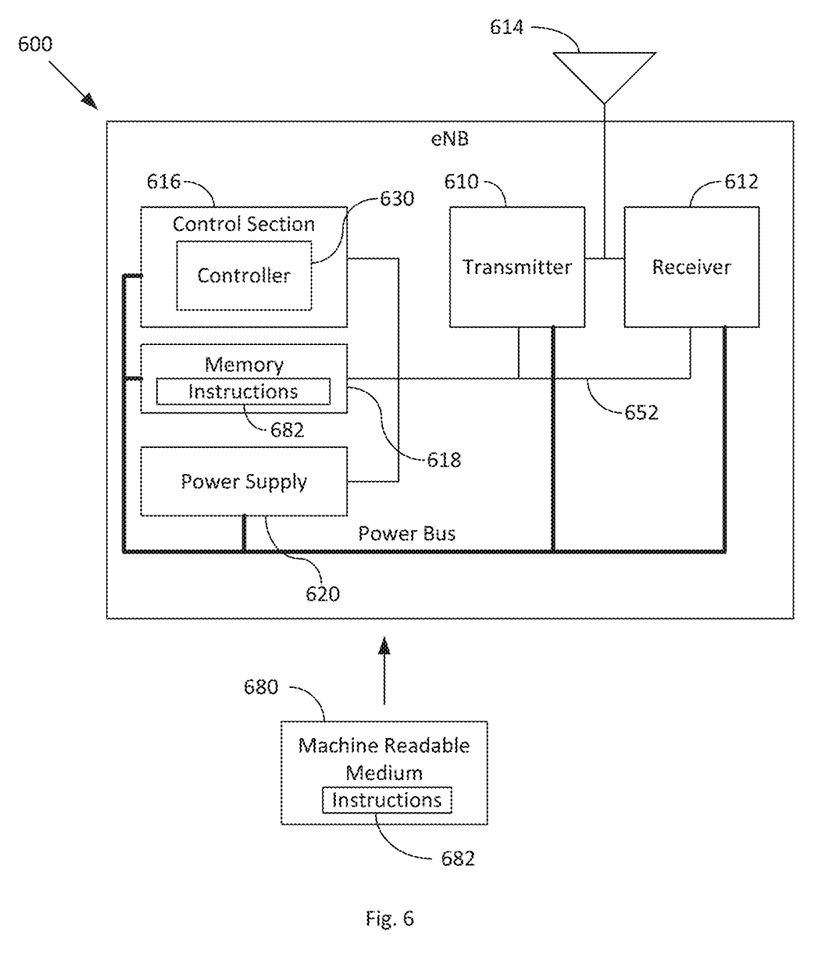
FIG. 6 illustrates an evolved Node B (eNB) according to an embodiment.

FIG. 6 illustrates an evolved Node B (eNB) 600 according to an embodiment. The eNB 600 contains at least one radio transmitter 610, receiver 612, an antenna system 614, a control section 616, memory 618 and a power supply 620. The control section 616 of the eNB 600 may include a controller 630. The controller may be arranged to provide resource management and logic control functions for allowing eNBs to directly communicate with each other, thereby eliminating the use of mobile switching systems (MSCs) or controllers (BSCs or RNCs).

The controller 630 of the eNB 600 may also provide functions including radio resource management (RRM), radio bearer control, radio admission control (access control), connection mobility management, resource scheduling between UEs and eNB radios, scheduling and transmitting messages (incoming calls and connection requests), broadcast information coordination (system information), and measurement reporting (to assist in handover decisions).

Moreover, the controller 630 may be arranged to send CSI-RS to UE(s), receive CQI feedback from the UE(s), re-calculate the MCS for UE(s) when applying MU-MIMO transmission. The controller 630 is further arranged to transmit PDSCH data and DM-RS to the UE(s). Upon receiving new CQI feedback from the UE(s), the controller 630 is arranged to apply and/or adjust the MCS and include the applied and/or adjusted MCS to the next PDSCH.

The eNB 600 illustrated in FIG. 6 provides fast adaptation of the modulation and coding scheme (MCS) for UEs with Multiple-input and multiple-output (MIMO) according to an embodiment upon which any one or more of the techniques (e.g., methodologies) discussed herein may perform. In alternative embodiments, the eNB 600 may operate as a standalone device or may be connected (e.g., networked) to other machines. The machine 600 may be any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more controller 630 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

At least one machine readable medium 680 may be used to store one or more sets of data structures or instructions 682 (e.g., software) embodying or utilized by any one or more of the techniques or functions described herein. The instructions 682 may also reside, at least partially, on additional machine readable memories such as memory 618, or within the controller 630 during execution thereof by the eNB 600. In an example, one or any combination of the controller 630, the memory 618, etc. may constitute machine readable media. While the machine readable medium 680 is illustrated as a single medium, the term "machine readable medium" may include a single medium or multiple media (e.g., a centralized or distributed database, and/or associated caches and servers) that configured to store the one or more instructions 682.

The term "machine readable medium" may include any medium that is capable of storing, encoding, or carrying instructions for execution by the eNB 600 and that cause the eNB 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 682, may further be transmitted or received over bus 652 utilizing any one of a number of transfer protocols (e.g., frame relay, internet protocol (IP), transmission control protocol (TCP), user datagram protocol (UDP), hypertext transfer protocol (HTTP), etc.).

Figure 7:
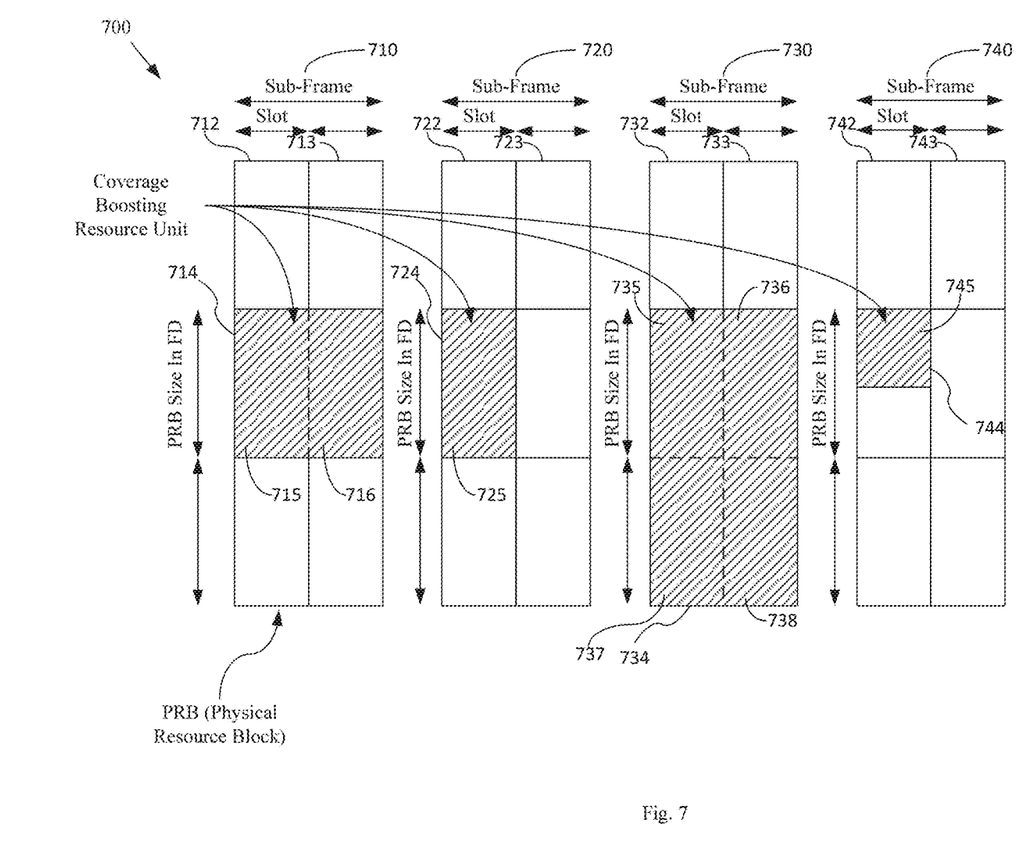
FIG. 7 illustrates coverage boosting resource unit (CBRU) configurations according to an embodiment.

FIG. 7 illustrates coverage boosting resource unit (CBRU) configurations 700 according to an embodiment. In FIG. 7, four sub-frames 710, 720, 730, 740 are shown. Each of the four sub-frames 710, 720, 730, 740 includes two slots 712/313, 722/323, 732/333, 742/343, respectively. The slots 712, 713, 722, 723, 732, 733, 742, 743 each represent 5 milliseconds in the time domain. In sub-frame 710, the CBRU 714 is spread over two resource blocks 715, 716. In sub-frame 720, the CBRU 724 is spread over one resource block 725. In sub-frame 730, the CBRU 734 is spread over four resource blocks 735, 736, 737, 738. In sub-frame 740, the CBRU 744 is spread over a partial resource block 745. A partial resource block as used herein refers to less than a full resource block, e.g., fewer OFDM symbols in the time domain and/or fewer than 12 consecutive sub-carriers in the frequency domain. For example, the partial resource block 745 uses 6 of the sub-carriers instead of 12 sub-carriers. In general one CBRU can be defined as a unit composed from the set of resource elements, over which the spreading is applied. For example, one CBRU may be at least one partial resource element such as shown by partial resource element 745, one resource element such as shown by resource block 725, a plurality of resource blocks as shown by resource blocks 715, 716, or by resource blocks 735, 736, 737, 738, or a combination of the above.

To improve coverage of low-cost MTC devices beyond coverage of LTE devices, the energy per information bit should be increased substantially. The energy from multiple consecutive sub-frames 710, 720, 730, 740, or frames which includes 10 of the sub-frames, is accumulated to increase the energy per transmitted information bit. However, MTC devices use very low data rates and are tolerable to latency. For instance, transmissions with 100 bytes/message with latency of up to 10 seconds are acceptable for MTC service in metering applications. These traffic characteristics can be exploited to improve coverage of MTC device at the expense of throughput.

Additional new transmission modes can be designed in LTE to boost system coverage in the order of 10-20 dB relative to existing coverage. From the physical layer perspective, substantial changes may be made in physical layer to boost coverage by tens of dB. The existing LTE physical frame structure and uplink (UL) and downlink (DL) modulations, e.g., Single Carrier Frequency Division Multiple Access (SC-FDMA) and Orthogonal Frequency-Division Multiple Access (OFDMA) respectively, may be followed as much as possible when boosting coverage. However, other embodiments may deviate from the ordinary LTE modulation and physical frame structure. Thus, the CBRU configurations 700 are used to support a coverage boosting transmission mode (CBTM).

Additional Notes & Examples

Example 1 may include subject matter (such as a method or means for performing acts) including sending, by a node, channel state information reference signals to user equipment, receiving, by the node, first channel quality indication feedback from the user equipment based on the channel state information reference signals, transmitting physical downlink shared channel data and demodulation reference signals using a first modulation and coding scheme based on the first channel quality indication feedback, receiving second channel quality indication feedback based on measurements performed by the user equipment on the demodulation reference signals and transmitting physical downlink shared channel data using a second modulation and coding scheme based on the second channel quality indication feedback.

Example 2 may optionally include the subject matter of Example 1, wherein the transmitting the physical downlink shared channel data using the second modulation and coding scheme comprises calculating the first modulation and coding scheme based on the first channel quality indication feedback.

Example 3 may optionally include the subject matter of any one or more of Examples 1-2, wherein the transmitting the physical downlink shared channel data using the second modulation and coding scheme comprises calculating the second modulation and coding scheme based on the second channel quality indication feedback based on measurement using the demodulation reference signals.

Example 4 may optionally include the subject matter of any one or more of Examples 1-3, wherein the physical downlink shared channel data and demodulation reference signals comprises sending the physical downlink shared channel data and demodulation reference signals together using physical downlink shared channel beam-forming.

Example 5 may optionally include the subject matter of any one or more of Examples 1-4, wherein the receiving the second channel quality indication feedback comprises receiving channel quality indication reporting feedback based on measurements performed on the demodulation reference signals.

Example 6 may optionally include the subject matter of any one or more of Examples 1-5, wherein the receiving the second channel quality indication feedback comprises receiving an explicit request from the user equipment to apply the second modulation and coding scheme based on the measurements performed on the demodulation reference signals.

Example 7 may optionally include the subject matter of any one or more of Examples 1-6, wherein the receiving the second channel quality indication feedback comprises receiving delta feedback, wherein the user equipment requests the node make an adjustment to the modulation and coding scheme based on the measurements performed on the demodulation reference signals.

Example 8 may optionally include the subject matter of any one or more of Examples 1-7, wherein the receiving the second channel quality indication feedback comprises receiving delta feedback that informs the node of channel quality changes since the last measurement that the user equipment performed.

Example 9 may include subject matter (such as a method or means for performing acts) including receiving, at user equipment, channel state information reference signals sent by a node, measuring, by the user equipment, the channel quality information over the channel state information reference signals, sending first channel quality indication feedback to the node, receiving, at the user equipment, demodulation reference signals, measuring, by the user equipment, channel quality information over the demodulation reference signals and sending, by the user equipment, second channel quality information feedback to the node based on measurement performed on the demodulation reference signals.

Example 10 may optionally include the subject matter of Example 9, wherein the physical downlink shared channel data and demodulation reference signals comprises sending the physical downlink shared channel data and demodulation reference signals together using physical downlink shared channel beam-forming.

Example 11 may optionally include the subject matter of any one or more of Examples 9-10, wherein the transmitting the second channel quality indication feedback comprises transmitting channel quality indication reporting feedback based on measurements performed on the demodulation reference signals.

Example 12 may optionally include the subject matter of any one or more of Examples 9-11, wherein the transmitting the second channel quality indication feedback comprises transmitting an explicit request from the user equipment to apply the second modulation and coding scheme based on the measurements performed on the demodulation reference signals.

Example 13 may optionally include the subject matter of any one or more of Examples 9-12, wherein the transmitting the second channel quality indication feedback comprises transmitting delta feedback, including a request for the node to make an adjustment to the modulation and coding scheme based on the measurements performed on the demodulation reference signals.

Example 14 may optionally include the subject matter of any one or more of Examples 9-13, wherein the transmitting the second channel quality indication feedback comprises transmitting delta feedback that informs the node of channel quality changes since the last measurement performed by the user equipment.

Example 15 includes subject matter (such as a device, apparatus, client or system) for a node for providing fast modulation and coding scheme adaptation for LTE with multiple-user multiple-input and multiple-output, including memory for storing data and a controller coupled to the memory, the controller is arranged to send channel state information reference signals to user equipment, receive first channel quality indication feedback from the user equipment based on the channel state information reference signals, transmit physical downlink shared channel data and demodulation reference signals using a first modulation and coding scheme based on the first channel quality indication feedback, receive second channel quality indication feedback based on measurements performed by the user equipment on the demodulation reference signals and transmit physical downlink shared channel data using a second modulation and coding scheme based on the second channel quality indication feedback.

Example 16 may optionally include the subject matter of Example 15, wherein the controller calculates the first modulation and coding scheme based on the first channel quality indication feedback.

Example 17 may optionally include the subject matter of any one or more of Examples 15-16, wherein the controller calculates the second modulation and coding scheme based on the second channel quality indication feedback based on measurement using the demodulation reference signals.

Example 18 may optionally include the subject matter of any one or more of Examples 15-17, wherein the controller sends the physical downlink shared channel data and demodulation reference signals together using physical downlink shared channel beam-forming.

Example 19 may optionally include the subject matter of any one or more of Examples 15-18, wherein the controller receives channel quality indication reporting feedback based on measurements performed on the demodulation reference signals.

Example 20 may optionally include the subject matter of any one or more of Examples 15-19, wherein the controller receives an explicit request from the user equipment to apply the second modulation and coding scheme based on the measurements performed on the demodulation reference signals.

Example 21 may optionally include the subject matter of any one or more of Examples 15-20, wherein the controller receives delta feedback, wherein the user equipment requests the node make an adjustment to the modulation and coding scheme based on the measurements performed on the demodulation reference signals.

Example 22 may optionally include the subject matter of any one or more of Examples 15-21, wherein the controller receives delta feedback that provides information regarding channel quality changes since the last measurement that the user equipment performed.

Example 23 includes subject matter (such as a device, apparatus, client or system) for user equipment for providing fast modulation and coding scheme adaptation for LTE with multiple-user multiple-input and multiple-output, including memory for storing data and a processor coupled to the memory, wherein the processor is arranged to receive channel state information reference signals sent by a node, measure the channel quality information over the channel state information reference signals, send first channel quality indication feedback to the node, receive demodulation reference signals, measure channel quality information over the demodulation reference signals and send second channel quality information feedback to the node based on measurement performed on the demodulation reference signals.

Example 24 may optionally include the subject matter of Example 23, wherein the processor sends the physical downlink shared channel data and demodulation reference signals together using physical downlink shared channel beam-forming.

Example 25 may optionally include the subject matter of any one or more of Examples 22-23, wherein the processor transmits channel quality indication reporting feedback based on measurements performed on the demodulation reference signals.

Example 26 may optionally include the subject matter of any one or more of Examples 22-24, wherein the processor transmits an explicit request from the user equipment to apply the second modulation and coding scheme based on the measurements performed on the demodulation reference signals.

Example 27 may optionally include the subject matter of any one or more of Examples 22-25, wherein the processor transmits delta feedback, including a request for the node to make an adjustment to the modulation and coding scheme based on the measurements performed on the demodulation reference signals.

Example 28 may optionally include the subject matter of any one or more of Examples 22-26, wherein the processor transmits delta feedback that informs the node of channel quality changes since the last measurement performed by the processor.

Example 29 may include subject matter (such as means for performing acts or machine readable medium including instructions that, when executed by the machine, cause the machine to perform acts) including sending, by a node, channel state information reference signals to user equipment, receiving, by the node, first channel quality indication feedback from the user equipment based on the channel state information reference signals, transmitting physical downlink shared channel data and demodulation reference signals using a first modulation and coding scheme based on the first channel quality indication feedback, receiving second channel quality indication feedback based on measurements performed by the user equipment on the demodulation reference signals and transmitting physical downlink shared channel data using a second modulation and coding scheme based on the second channel quality indication feedback.

Example 30 may optionally include the subject matter of Example 29, wherein the receiving the second channel quality indication feedback comprises one selected from a group consisting of receiving channel quality indication reporting feedback based on measurements performed on the demodulation reference signals, receiving an explicit request from the user equipment to apply the second modulation and coding scheme based on the measurements performed on the demodulation reference signals, receiving delta feedback, wherein the user equipment requests the node make an adjustment to the modulation and coding scheme based on the measurements performed on the demodulation reference signals and receiving delta feedback that informs the node of channel quality changes since the last measurement that the user equipment performed.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for providing fast modulation and coding scheme adaptation for LTE, comprising:
   sending, by a node, channel state information reference signals to user equipment;
   receiving, by the node, first channel quality indication feedback from the user equipment based on the channel state information reference signals;
   transmitting physical downlink shared channel data and demodulation reference signals using a first modulation and coding scheme based on the first channel quality indication feedback;
   receiving second channel quality indication feedback based, at least in part, on measurements performed by the user equipment on the demodulation reference signals; and
   transmitting physical downlink shared channel data using a second modulation and coding scheme based on the second channel quality indication feedback,
   wherein sending the physical downlink shared channel data and demodulation reference signals comprises sending the physical downlink shared channel data and demodulation reference signals together using physical downlink shared channel beam-forming, and
   the second channel quality indication feedback comprises one of:
      channel quality indication reporting feedback that is based, at least in part, on measurements performed on the demodulation reference signals free from an indication to change the modulation and coding scheme,
      an explicit request to apply a particular modulation and coding scheme that is determined by the user equipment and is based, at least in part, on the measurements performed on the demodulation reference signals, or
      delta feedback that comprises channel quality changes since a last measurement that the user equipment performed.

2. The method of claim 1, further comprising calculating the first modulation and coding scheme based on the first channel quality indication feedback prior to transmitting the physical downlink shared channel data using the first modulation and coding scheme.

3. The method of claim 1, wherein calculating the second modulation and coding scheme based on the second channel quality indication feedback based, at least in part, on measurement using the demodulation reference signals prior to transmitting the physical downlink shared channel data using the second modulation and coding scheme.

4. The method of claim 1, wherein the second channel quality indication feedback comprises the channel quality indication reporting feedback.

5. The method of claim 1, wherein the second channel quality indication feedback comprises the explicit request.

6. The method of claim 1, wherein the second channel quality indication feedback comprises the delta feedback.

7. A method for providing fast modulation and coding scheme adaptation for LTE, comprising:
   receiving, at user equipment, channel state information reference signals sent by a node;
   measuring, by the user equipment, a channel quality information over the channel state information reference signals;
   sending first channel quality indication feedback to the node;
   receiving, at the user equipment, demodulation reference signals and physical downlink shared channel data sent together using physical downlink shared channel beam-forming;
   measuring, by the user equipment, channel quality information over the demodulation reference signals;
   sending, by the user equipment, second channel quality information feedback to the node based, at least in part, on the measurement of the channel quality information over the demodulation reference signals; and
   receiving physical downlink shared channel data using a second modulation and coding scheme based on the second channel quality indication feedback,
   wherein the second channel quality indication feedback comprises one of:
      channel quality indication reporting feedback that is based, at least in part, on measurements performed on the demodulation reference signals free from an indication to change the modulation and coding scheme,
      an explicit request to apply a particular modulation and coding scheme that is determined by the user equipment and is based, at least in part, on the measurements performed on the demodulation reference signals, or
      delta feedback that comprises channel quality changes since a last measurement that the user equipment performed.

8. The method of claim 7, wherein the second channel quality information feedback comprises the channel quality indication reporting feedback.

9. The method of claim 7, wherein the second channel quality information feedback comprises the explicit request.

10. The method of claim 7, wherein the second channel quality information feedback comprises the delta feedback.

11. A node for providing fast modulation and coding scheme adaptation for LTE, comprising:
    memory for storing data; and
    a controller, coupled to the memory, the controller arranged to:
       send channel state information reference signals to user equipment;
       receive first channel quality indication feedback from the user equipment based on the channel state information reference signals;
       transmit physical downlink shared channel data and demodulation reference signals using a first modulation and coding scheme based on the first channel quality indication feedback;
       receive second channel quality indication feedback based, at least in part, on measurements performed by the user equipment on the demodulation reference signals; and transmit physical downlink shared channel data using a second modulation and coding scheme based on the second channel quality indication feedback,
wherein the physical downlink shared channel data and the demodulation reference signals are sent together using physical downlink shared channel beam-forming, and the second channel quality indication feedback comprises one of:
  channel quality indication reporting feedback that is based, at least in part, on measurements performed on the demodulation reference signals free from an indication to change the modulation and coding scheme,
  an explicit request to apply a particular modulation and coding scheme that is determined by the user equipment and is based, at least in part, on the measurements performed on the demodulation reference signals, or
  delta feedback that comprises channel quality changes since a last measurement that the user equipment performed.

12. The node of claim 11, wherein the controller calculates the first modulation and coding scheme based on the first channel quality indication feedback prior to transmission of the physical downlink shared channel data using the first modulation and coding scheme.

13. The node of claim 11, wherein the controller calculates the second modulation and coding scheme based on the second channel quality indication feedback based, at least in part, on measurement using the demodulation reference signals prior to transmission of the physical downlink shared channel data using the second modulation and coding scheme.

14. The node of claim 11, wherein the controller receives the channel quality indication reporting feedback.

15. The node of claim 11, wherein the controller receives the explicit request.

16. The node of claim 11, wherein the controller receives the delta feedback.

17. A user equipment for providing fast modulation and coding scheme adaptation for LTE, comprising:
  memory for storing data; and
  a processor, coupled to the memory, the processor arranged to:
    receive channel state information reference signals sent by anode;
    measure the channel quality information over the channel state information reference signals;
    send first channel quality indication feedback to the node;
    receive demodulation reference signals through a Multi User Multiple-input and multiple-output (MU MIMO) transmission, wherein the demodulation reference signals and physical downlink shared channel data are received together using physical downlink shared channel beam-forming;
    measure channel quality information over the demodulation reference signals; and
    send second channel quality information feedback to the node based, at least in part, on the measurement of the channel quality information over the demodulation reference signals,
  wherein the second channel quality indication feedback comprises one of:
    channel quality indication reporting feedback that is based, at least in part, on measurements performed on the demodulation reference signals free from an indication to change the modulation and coding scheme,
    an explicit request to apply a particular modulation and coding scheme that is determined by the user equipment and is based, at least in part, on the measurements performed on the demodulation reference signals, or
    delta feedback that comprises channel quality changes since a last measurement that the user equipment performed.

18. The user equipment of claim 17, wherein the processor transmits the channel quality indication reporting feedback.

19. The user equipment of claim 17, wherein the processor transmits the explicit request.

20. The user equipment of claim 17, wherein the processor transmits the delta feedback.

21. The method of claim 1, wherein:
the channel state information reference signals are sent to the user equipment using a Single User Multiple-input and multiple-output (SU MEMO) transmission, and the physical downlink shared channel data and demodulation reference signals are transmitted using a Multi User MIMO (MU MIMO) transmission.

22. The method of claim 1, wherein adjustment from the first modulation and coding, scheme to the second modulation and coding scheme is performed free from tracking Acknowledgement (ACK)/Negative ACK (NACK) messages.

23. The method of claim 1, further comprising mapping modulated symbols to at least a partial resource block to form a coverage boosting resource unit, the coverage boosting resource unit spreading at least one data bit over at least the partial resource block.

* * * * *

UNITED STATES PATENT AND TRADEMARK OFFICE
CERTIFICATE OF CORRECTION

PATENT NO. : 9,609,564 B2
APPLICATION NO. : 14/125472
DATED : March 28, 2017
INVENTOR(S) : Davydov et al.

Page 1 of 1

It is certified that error appears in the above-identified patent and that said Letters Patent is hereby corrected as shown below:

In Column 15, Line 48, in Claim 17, delete "anode;" and insert --a node;-- therefor In Column 16, Line 37, in Claim 21, delete "(SU MEMO)" and insert --(SU MIMO)-- therefor In Column 16, Line 42, in Claim 22, delete "coding," and insert --coding-- therefor Signed and Sealed this
First Day of May, 2018

Andrei Iancu
*Director of the United States Patent and Trademark Office*